United States Patent
Kato (10) Patent No.: US 8,860,854 B2
(45) Date of Patent: Oct. 14, 2014

(54) CAMERA

(75) Inventor: Tetsuaki Kato, Saitama (JP)

(73) Assignee: Pentax Ricoh Imaging Company, Ltd., Tokyo (JP)

( * ) Notice: Subject to any disclaimer, the term of this patent is extended or adjusted under 35 U.S.C. 154(b) by 133 days.

(21) Appl. No.: 13/566,179

(22) Filed: Aug. 3, 2012

(65) Prior Publication Data

US 2013/0033625 A1 Feb. 7, 2013

(30) Foreign Application Priority Data

Aug. 4, 2011 (JP) .................. 2011-170958

(51) Int. Cl.
*H04N 9/64* (2006.01)
*H04N 5/235* (2006.01)
*H04N 5/361* (2011.01)
*H04N 5/365* (2011.01)
*H04N 5/232* (2006.01)

(52) U.S. Cl.
CPC .............. *H04N 5/361* (2013.01); *H04N 5/2353* (2013.01); *H04N 5/3655* (2013.01); *H04N 5/23245* (2013.01)
USPC ........................................................ 348/244

(58) Field of Classification Search
CPC . H04N 5/361; H04N 5/23245; H04N 5/2353; H04N 5/3655
USPC .......................................... 348/241, 243, 244
See application file for complete search history.

(56) References Cited

U.S. PATENT DOCUMENTS

| | | | |
|---|---|---|---|
| 6,798,456 B1 * | 9/2004 | Sato | 348/362 |
| 7,136,100 B1 * | 11/2006 | Kato et al. | 348/241 |
| 7,508,428 B2 * | 3/2009 | Kato | 348/241 |
| 7,589,769 B2 * | 9/2009 | Nakata et al. | 348/243 |
| 7,636,113 B2 * | 12/2009 | Kato | 348/243 |
| 2004/0196393 A1 * | 10/2004 | Nakata et al. | 348/241 |
| 2008/0055444 A1 * | 3/2008 | Furuta et al. | 348/298 |
| 2009/0167905 A1 * | 7/2009 | Ishibashi et al. | 348/241 |
| 2009/0262224 A1 * | 10/2009 | Sambongi | 348/243 |
| 2009/0268068 A1 * | 10/2009 | Tsukamoto et al. | 348/296 |
| 2009/0278964 A1 * | 11/2009 | McGarvey et al. | 348/243 |
| 2013/0070110 A1 * | 3/2013 | Yamaguchi | 348/207.1 |

FOREIGN PATENT DOCUMENTS

| | | |
|---|---|---|
| JP | 2000-209506 A | 7/2000 |
| JP | 2005-079948 A | 3/2005 |

* cited by examiner

*Primary Examiner* — Aung S Moe
*Assistant Examiner* — Amy Hsu
(74) *Attorney, Agent, or Firm* — Greenblum & Bernstein P.L.C.

(57) ABSTRACT

A camera a has an image sensor; an exposure controller that conducts a main exposure and a dark exposure, in order, when a long-exposure shooting is carried out; an image signal processor that processes image-pixel signals that are generated by the main exposure and are read from the image sensor; and a noise reduction processor that reduces dark current components in the image-pixel signals on the basis of dark current components in the dark exposure. The exposure controller operates the image sensor for heating between the main exposure and the dark exposure.

22 Claims, 8 Drawing Sheets

CAMERA

BACKGROUND OF THE INVENTION

1. Field of the Invention

This invention relates to a camera that is capable of long-exposure photography, and particularly to a noise reduction process that reduces noise caused by long-exposures.

2. Description of the Related Art

A digital camera configured for long-exposure photography can be used for shooting night scenes, fireworks, celestial bodies, and so on. This so called "bulb shooting" photography allows a trace of a star's movement or the headlights of the vehicle to be imaged on a picture.

In bulb shooting, dark current occurs as noise in an image sensor such as a CCD. The amount of dark current in bulb shooting is greater than that from normal shooting. Also, the value of dark current is different in each pixel. To reduce this fixed pattern noise, an image sensor is exposed in a state in which light is completely blocked after a long exposure is carried out (hereinafter, the first exposure will be referred to as a "main exposure" and the second exposure as a "dark exposure"). A noise component included in image signals is sampled from the difference between output signals of the main exposure and output signals of the dark exposure, so that the noise component can be removed. This process is described, for example, in JP2000-209506A.

Moreover, the temperature of an image sensor increases as the length of exposure increases. Accordingly, dark current increases with increasing period of exposure. One method of reducing a noise component that increases with temperature is to repeatedly take a dark exposure. Then, a noise component can be calculated from the average of a series of detected dark currents. This process is described in U.S. Pat. No. 7,636,113.

When the ambient temperature is extremely low at a photography location, the increase in the temperature of the image sensor is restricted. For example, when photographing a celestial body using bulb shooting at a high-altitude location with a low ambient temperature, the temperature of the image sensor decreases as the exposure time passes. The dark current output level depends upon the temperature of the image sensor; therefore, the lower the temperature, the greater the decrease in the output level of the dark current. Consequently, a dark exposure should last long enough to obtain dark current components accurately, and a totally long photograph time losses convenience.

SUMMARY OF THE INVENTION

An object of the present invention is to provide a camera that is capable of accurately detecting a dark current in a short exposure period, regardless of low ambient temperature conditions.

A camera according to the present invention has an image sensor; an exposure controller that carries out a main exposure and a dark exposure, in order, during long-exposure photography; an image-signal processor that processes image-pixel signals that are generated in the main exposure and read from the image sensor; and a noise-reduction processor that reduces dark current components included in the image-pixel signals on the basis of dark current components obtained from the dark exposure. The exposure controller operates the image sensor for heating between the main exposure and the dark exposure.

A camera according to another aspect of the present invention has an image sensor; an exposure controller that carries out a main exposure and a dark exposure, in order, during long-exposure photography; an image-signal processor that processes image-pixel signals that are generated in the main exposure and read from the image sensor; and a noise-reduction processor that reduces dark current components included in the image-pixel signals on the basis of dark current components obtained from the dark exposure. During the dark exposure the exposure controller operates at least one device that is activated by an electric power supply.

BRIEF DESCRIPTION OF THE DRAWINGS

The present invention will be better understood from the description of the preferred embodiments of the invention set forth below, together with the accompanying drawings, in which.

DESCRIPTION OF THE PREFERRED EMBODIMENTS

Hereinafter, the preferred embodiments of the present invention are described with reference to the attached drawings.

Figure 1:
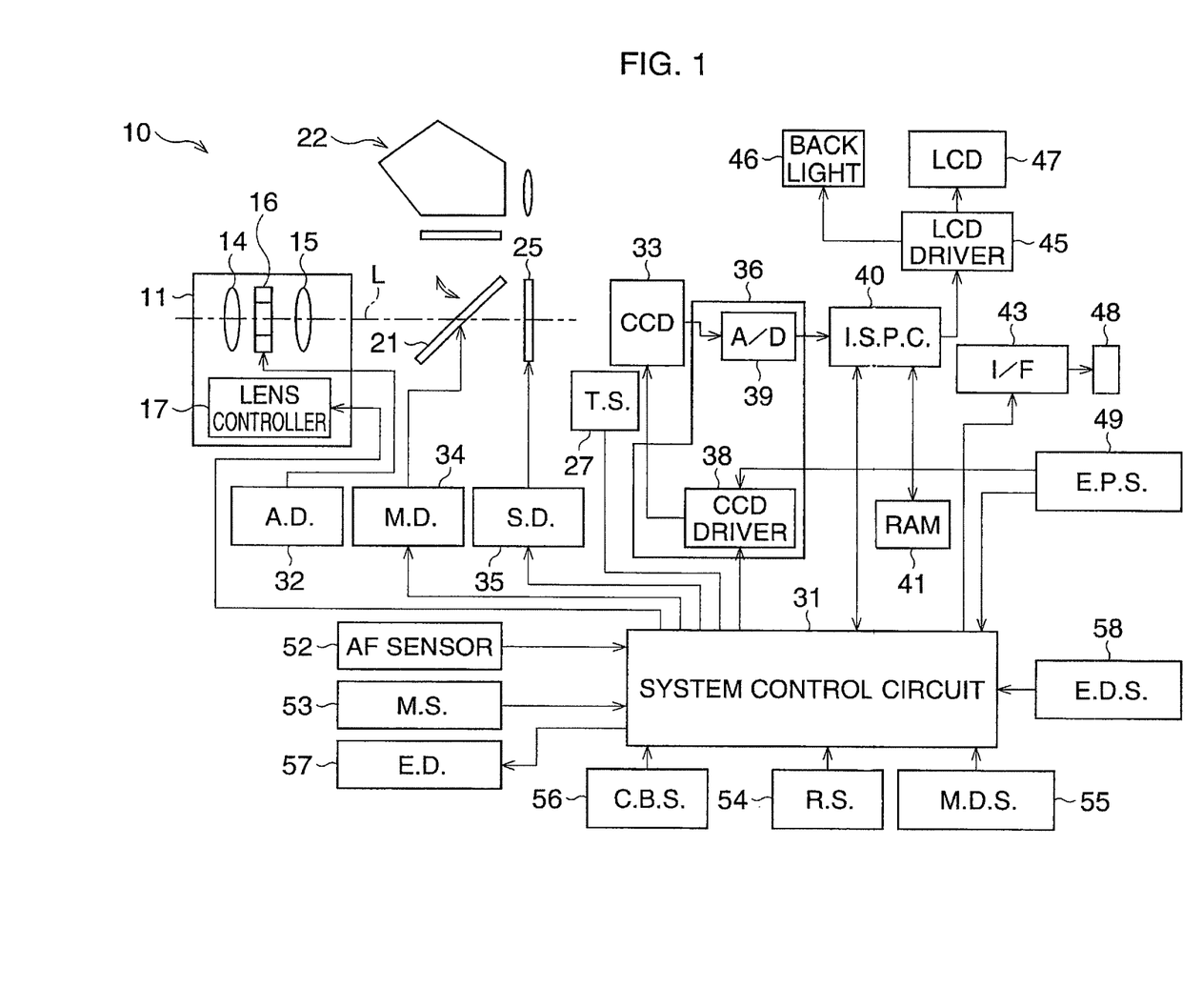
FIG. 1 is a block diagram of a digital camera according to a first embodiment.

FIG. 1 is a block diagram of a digital camera according to a first embodiment.

The digital camera 10 is an SLR-type camera that is equipped with an interchangeable lens unit 11 mounted on the front surface of the camera 10, a viewfinder 22, and an LCD 47 arranged on the back surface of the camera 10. A system control circuit 31 including a CPU, a ROM unit, a RAM unit, etc., controls the motion of the camera 10. A program for the control of the camera 10 is stored in the ROM unit.

When electric power is activated by the operation of a power lever (not shown), an electric power supplier 49 supplies electric power to the system control circuit 31, a CCD driver 49 in an initial circuit 36, and so on. Then, the digital camera 10 is activated in accordance to the operation control program. While electric power is in the ON state, a given photography mode is set.

A mode dial (not shown) is provided on the upper surface of the camera 10 and is operated by a user when selecting from a series of photography modes. A user can select a point-and-shoot auto mode that automatically focuses on a subject image and sets exposure values, or select a manual-exposure mode in which exposure values may be set manually.

The interchangeable lens unit 11 is equipped with photographing optical lenses 14 and 15, which are driven by a lens controller 17 to adjust a focal length. Light passing through the lens unit 11 is directed to the viewfinder 22 by a quick return mirror 21. A user views a target subject through the objective lens of the viewfinder 22.

When a release button (not shown) is depressed halfway, the system control circuit 31 detects an operation signal fed from a release switch 54 and carries out an AF adjustment process and an exposure calculation process. In the AF adjustment process, an AF sensor 52 outputs luminance signals of the target subject and the system control circuit 31 outputs a control signal to the lens controller 17 on the basis of the luminance signals so that the photographing optical lenses 14 and 15 are repositioned to bring the subject image into focus.

Also, the system control circuit 31 calculates an F value and a shutter speed (a period of exposure) from an exposure program diagram, in response to a subject brightness signal fed from a metering sensor 53. An aperture 16 provided in the lens unit 11 is driven by an aperture driver 32 on the basis of the calculated aperture value. An exposure display 57 displays exposure information such as the aperture value and shutter speed along the bottom line of the visual field that is formed by the viewfinder 22.

When the release button is depressed completely, a photographing or shooting process is carried out in response to an operation signal fed from a release switch 54. Concretely, the quick return mirror 21 moves upward and a focal plane shutter 25 opens for the exposure period corresponding to the calculated shutter speed. Thus, the photographing optical lenses 14 and 15 form an object image on the photo-receiving surface of the CCD 33. The quick return mirror 21 and the focal plane shutter 25 are driven by a mirror driver 34 and a shutter driver 35, respectively.

After the exposure period ends, one frame's worth of image-pixel signals are read from the CCD 33 by the CCD driver 38 and are fed to an A/D converter 39. On the light-receiving surface of the CCD 33 a color filter array, in which R, G, and B elements are Bayer-arrayed, is disposed. Accordingly, R, G, and B image-pixel signals are output from the CCD 33. The R, G, and B image-pixel signals are converted from analog signals to digital signals and output to an image-signal processing circuit 40.

The image-signal processing circuit 40 applies an image-signal process such as white-balance processing to the input R, G, and B image-pixel signals to generate color image data. The generated color image data are temporarily stored in the RAM 41 and output to the system control circuit 31 to compress the image data. The compressed still-image data are then recorded in a memory card 48 such as a SD card via a card I/F 43.

Also, a recorded still image is temporarily displayed on the LCD 47 soon after the photography process. An LCD driver 45 drives the LCD 47 on the basis of image data fed from the image-signal processing circuit 40 and turns a backlight on in accordance to the displayed still image.

On the other hand, when the manual exposure mode is selected, a user can set an aperture value and/or shutter speed (i.e., a period of exposure) to a preferred value by operating a cross button or an electronic dial (neither of which are shown in the drawings). The system control circuit 31 sets the input values on the basis of an operation signal fed from an electronic dial switch 58.

In the case of shooting night scenes or celestial bodies, a shutter speed is set for a relatively long exposure compared to that in a normal photography mode. Generally, such shooting based on long-exposures is also known as "Bulb shooting." In the present embodiment, when a shutter speed (i.e., an exposure period) is set to a period longer than a predetermined period (e.g., more than 0.5 or 1 second), it is regarded as long-exposure shooting. Accordingly, an exclusive noise-reduction process is applied to one frame's worth of image-pixel signals. Note that a user may optionally perform the noise reduction process after bulb shooting by selecting a user setting.

In the bulb shooting, an exposure based on the calculated shutter speed (hereinafter, called a "main exposure") is carried out first, and a further exposure is then carried out in a state when the shutter 25 is closed (hereinafter, called a "dark exposure") after the main exposure.

Image-pixel signals from the main exposure are temporarily stored in the RAM unit provided in the system control circuit 31. On the other hand, electric charges that accumulate during the dark exposure are output from the CCD as dark current components. The image signal processing circuit 40 carries out the noise reduction process that decreases the image-pixel signals with dark current components. This process is carried out for each pixel. Thus, fixed pattern noise is removed from the R, G, and B image-pixel signals.

A temperature sensor 27 is positioned near the CCD 33. The system control circuit 31 monitors a temperature signal that is output from the temperature sensor 27 during the Bulb shooting that includes the main exposure and the dark exposure. Then, as described below, the CCD 33 is operated to increase the temperature of the CCD 33.

Next, the relationship between the CCD temperature and a generated dark current is explained with reference to FIGS. 2-3.

Figure 2:
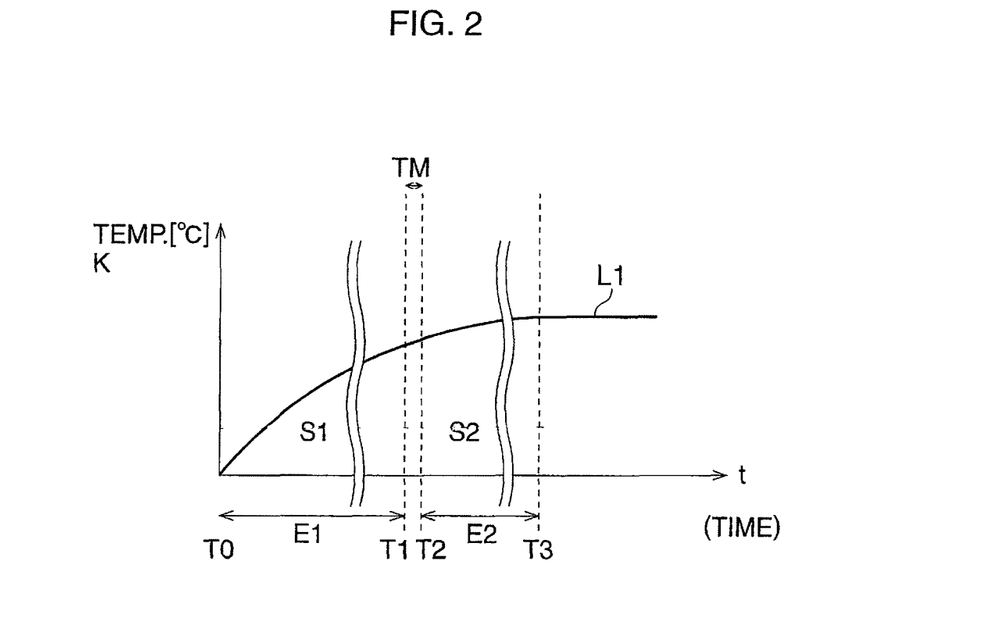
FIG. 2 is a graph illustrating the change in temperature of the CCD during the main exposure and the dark exposure in a state when the temperature of the CCD is increasing.
Figure 3:
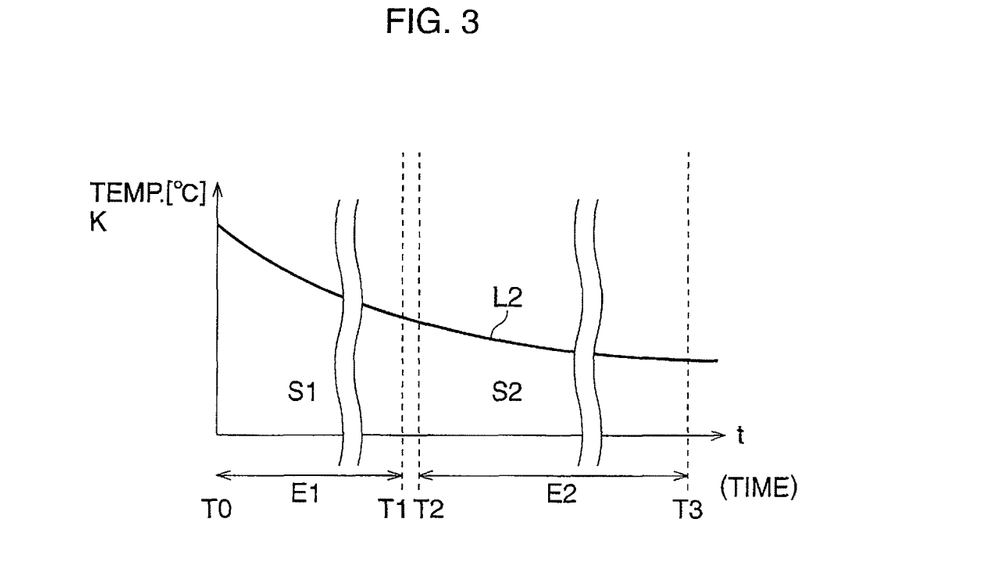
FIG. 3 is a graph illustrating the change in temperature of the CCD during the main exposure and the dark exposure in a state when the temperature of the CCD is decreasing.

FIG. 2 is a graph indicating the change in temperature during the main exposure and the dark exposure in a state where the temperature of the CCD increases. FIG. 3 is a graph indicating the change in temperature during the main exposure and the dark exposure in a state where the temperature of the CCD decreases. The two exposures shown in FIG. 2 and FIG. 3 are carried out continuously. Note that a reading period "TM" for reading one frame's worth of image-pixel signals occurs between the main exposure and the dark exposure.

As is well known, a dark current is noise caused by heating of an image sensor such as the CCD 33. The value of the dark current varies with the changing CCD temperature. In FIG. 2, a curved line "L1" represents the changing temperature of the CCD 33.

The total amount of dark current that occurs in the main exposure or the dark exposure is calculated for each pixel by using the following formula. Note that "Sn" represents a total amount of dark current at a time "tn" after the start of the main exposure, "Tn" represents the temperature of the CCD 33 at the time "tn", "Ts" represents the temperature of the CCD 33 at the start of the main exposure, and "a" represents a temperature coefficient of the CCD 33.

$$Sn = 2^{(Tn-Ts)/\alpha} \quad (1)$$

In the present embodiment, dark current components to be removed from the image-pixel signals are generated by the dark exposure. A period of the dark exposure is adjusted such that the amount of dark current in the dark exposure becomes equal to that in the main exposure. In the dark exposure, all of the accumulated charges become dark current components. Note that the absolute amount of dark current is different in each pixel. However, by subtracting a value of dark current from a corresponding pixel value of image-pixel signals, dark current components can be removed or reduced from the total of one frame's worth of image-pixel signals.

As can be seen from the formula (1), even if the CCD temperature changes during the main/dark exposure due to a change in the outside-air temperature, the amount of dark current in the dark exposure can be adjusted to equal that of the main exposure by adjusting the period of the dark exposure. When shooting in a normal photography environment, the temperature of the CCD 33 increases by heat produced while the CCD 33 is driven. The longer a period of exposure, the higher the temperature increases. Therefore, the temperature of the CCD 33 generally increases substantially after the main exposure. When the period of the main exposure is "E1" (=T1−T0) and the amount of dark current obtained by the formula (1) is "S1", the period of the dark exposure "E2" (=T3−T2) is shorter than the period "E1" because the amount of dark current "S2" soon reaches the total amount of dark current "S1" because of the increase in the temperature.

On the other hand, when the outside-air temperature is very low, the temperature of the CCD 33 decreases. As can be seen from a curved line "L3" in FIG. 3, the temperature of the CCD 33 does not increase regardless of the motion of the CCD 33; inversely, the temperature decreases with the lapse of the main exposure. The decrease in the temperature continues during the period when the image-pixel signals are read. In this case, the output of dark current decreases (see the formula (1)). Consequently, the period of the dark exposure "E2" (T3−T2) that is necessary for obtaining an amount of dark current "S2" that is equal to "S1" becomes longer than the period of the dark exposure "E1" (=T1−T0).

In this embodiment, the CCD 33 is operated for heating between the main exposure and the dark exposure to increase the CCD temperature temporarily. Hereinafter, the heating motion of the CCD 33 is explained with FIG. 4.

Figure 4:
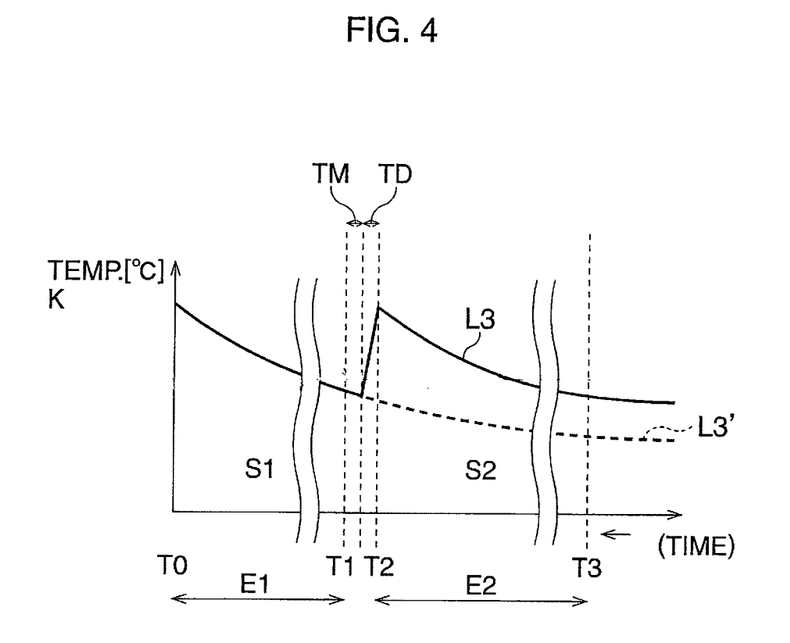
FIG. 4 is a graph showing the change in the CCD temperature when the CCD is operated for heating.

FIG. 4 is a graph showing the change in the CCD temperature when the CCD 33 is operated for heating.

After the period of the main exposure "E1" is finished and the image-pixel signals charged in the CCD 33 are read from the CCD 33 during the period "TM", the CCD 33 goes into a "heating motion" before the dark exposure starts. Concretely, a heating motion that reads electric charges accumulated in a shutter-closed state is carried out. This forced motion of the CCD 33 generates heat and increases the temperature of the CCD 33. This motion is separate from the reading of image-pixel signals that forms a photographic image. The read image-pixel signals are abandoned without utilizing a photographing process or an image recording process. Note that various motions may be applied as a heating motion. The CCD 33 may be subjected to an arbitrary heating motion that is substantially useless with respect to a shooting or image recording process.

The temperature of the CCD 33 temporarily increases by operating the CCD 33 for a predetermined period "TD". Since the temperature at the start of the dark exposure is relatively high, a high output level of dark current can be maintained in spite of a decrease of the temperature during the dark exposure. Consequently, the period of the dark exposure "E2" is shortened. In FIG. 4, a curved line "L3" represents the change in the CCD temperature with the heating motion of the CCD 33, whereas a curved line "L3'" represents the change in the CCD temperature without the heating motion.

The timing of the completion of the dark exposure is adjusted such that the amount of dark current obtained in the dark exposure is the same as that obtained in the main exposure. Concretely, regarding a given predetermined pixel (s), the amount of dark current in the main exposure is first calculated based on the formula (1). Then, the amount of dark current in the dark exposure is successively calculated based on the formula (1) and it is determined successively whether the amount of dark current in the dark exposure is equal to that in the main exposure. The dark exposure is finished at a time when the amount of dark current in the dark exposure is equal to or greater than that in the main exposure.

The detection of the CCD temperature is carried out at short time intervals (e.g. 100 msec) from the main exposure to the dark exposure. During the dark exposure, a calculation of dark current, a comparison of it with the total dark current from the main exposure, and a determination of the completion timing of the dark exposure is carried out at the short time intervals.

In this case, the system control circuit 31 calculates a total amount of dark current occurring in the main exposure by using the following formula. Note that "S1" represents the total amount of dark current in the main exposure, "k" represents the time of temperature detection after the start of the main exposure, "T0" represents a temperature at the start of the main exposure, "Tk" represents a detected temperature at the time "k", "m" represents the time of temperature detection at the end of the main exposure, and "Tm" represents the temperature at that time.

$$S1 = \sum_{k=0}^{k=m} 2^{\frac{(T_{k+1}-T_k)}{\alpha}} \quad (2)$$

Then, when the dark exposure starts, a total amount of dark current is calculated by the following formula at the predetermined time intervals. Note that "S2" represents a total amount of dark current in the main exposure, represents a time of temperature detection after the start of the dark exposure, "T0" represents the temperature at the start of the dark exposure, "Tj" represents the detected temperature at time "j", "l" represents the time of temperature detection at the end of the main exposure, and "Tl" represents the temperature at that time. When "S2" is equal to or greater than "S1", the dark exposure is completed.

$$S2 = \sum_{j=0}^{j=l} 2^{\frac{(T_{j+1}-T_j)}{\alpha}} \quad (3)$$

Such control of the completion timing of the dark exposure allows a positive adjustment to be made to the heating motion period "TD" and the period of the dark exposure. For example, a relationship between a change in the CCD temperature, an increase in the temperature due to the heating motion of the CCD, and the timing of the completion of the dark exposure can be established empirically and its data can be stored in a memory. Then, the period of a heating motion and the period of the dark exposure can be set in accordance to a change in temperature during the main exposure based on the stored information.

Herein, the period of the heating motion "TD" is set such that the period of the dark exposure is shorter than that of the main exposure. Concretely, the period "TD" is set to a period in which a decreasing temperature returns to a temperature that is close to the temperature at the start of the main exposure (see FIG. 4).

Next, a long-exposure photography process is explained with reference to FIGS. 5 and 6.

Figure 5:
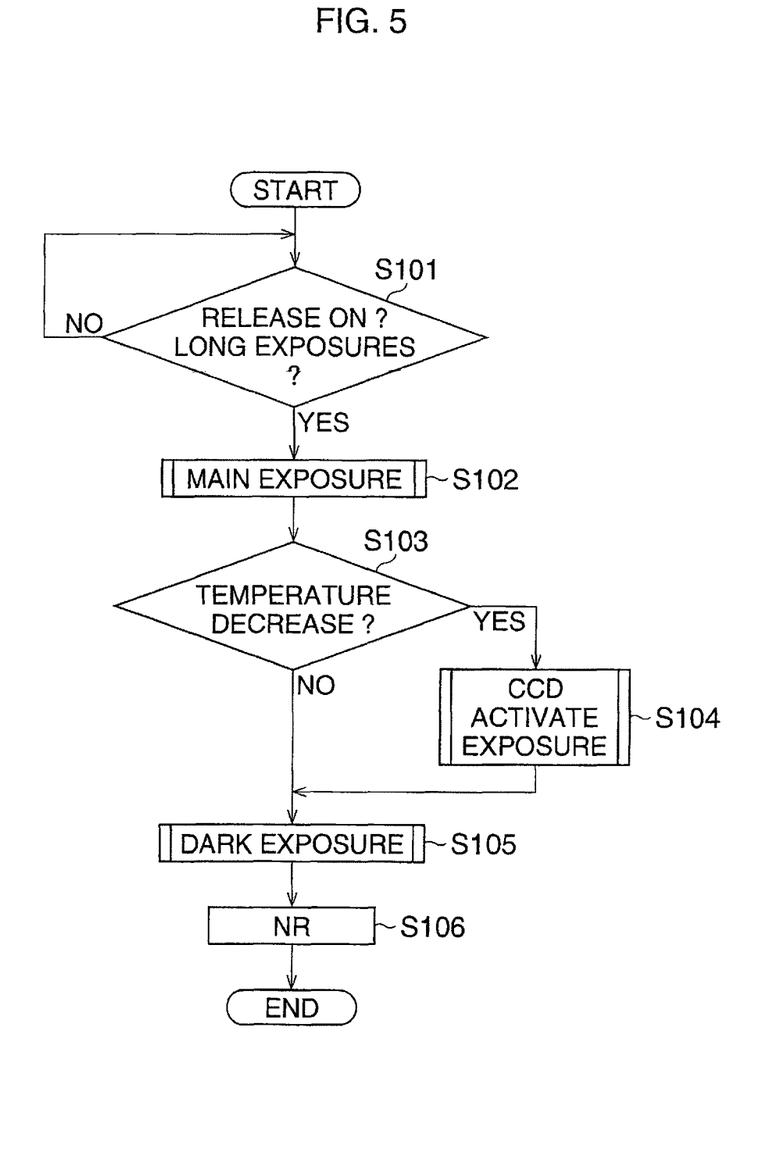
FIG. 5 is a flowchart of the long-exposure photography process.

FIG. 5 is a flowchart of the long-exposure photography process. FIG. 6 is a timing chart of the photography process.

When a shutter speed, i.e., exposure period, is set to a value equal to or longer than a given period in the manual exposure mode and a release button is depressed, the long-exposure photography process is carried out (S101 and S102). Herein, it is determined that the long-exposure photography process should be conducted when the exposure period is greater than or equal to 0.5 second.

During the long-exposure photography process, temperature data are output from the temperature sensor 27 at constant time intervals (e.g., 100 msec). In the main exposure, it is determined whether or not the temperature of the CCD 33 decreases during the main exposure (S103). Herein, the temperature at the end of the main exposure is compared with the temperature at the start of the main exposure.

Figure 6:
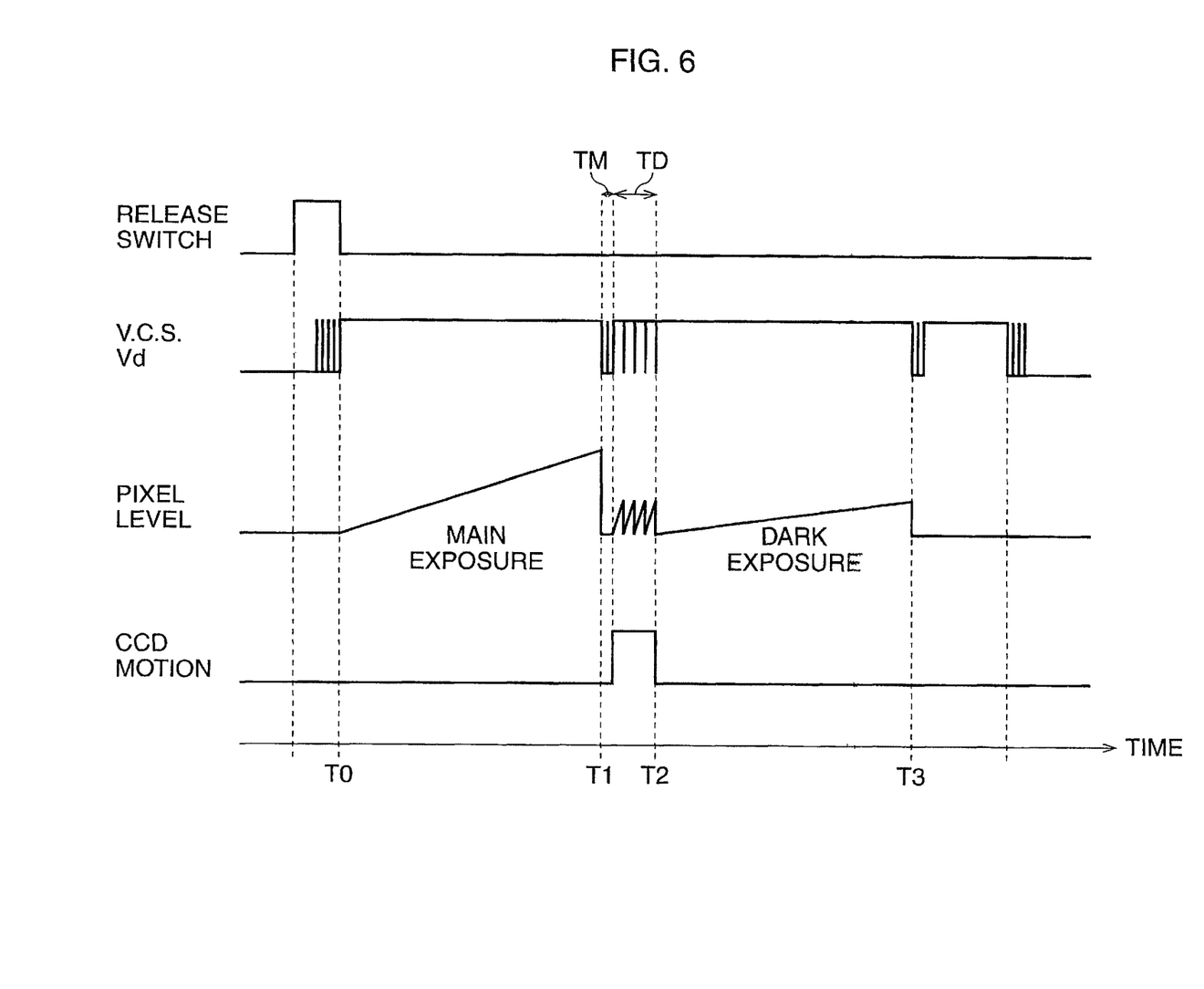
FIG. 6 is a timing chart of the photography process.

When it is determined at Step S103 that the temperature of the CCD 33 decreases, the CCD 33 is operated for a given interval "TD" after the image-pixel signals are read from the CCD 33, as shown in FIG. 6 (S104). This heating motion increases the temperature of the CCD 33. Then, the dark exposure is carried out after the heating motion (S105). Consequently, dark current components are generated. Furthermore, a noise reduction process is carried out (S106). On the other hand, when the temperature does not decrease in the main exposure, the CCD 33 is not operated and the dark exposure is directly started.

In this way, in the present embodiment the CCD 33 is operated after the main exposure and before the dark exposure. Thus, a decrease in dark current is prevented even if the ambient temperature at a photography location is low, so that Bulb shooting can be effectively carried out. And because the temperature is successively detected, the CCD 33 is operated only when necessary. Also, the period of the dark exposure can be optionally set in accordance to a change in the temperature by utilizing the above described formula.

Next, a digital camera according to the second embodiment is explained with reference to FIGS. 7-9. The second embodiment is different from the first embodiment in that some devices incorporated in the camera, particularly devices other than the CCD, are operated for heating. Other constructions are substantially the same as those in the first embodiment.

Figure 7:
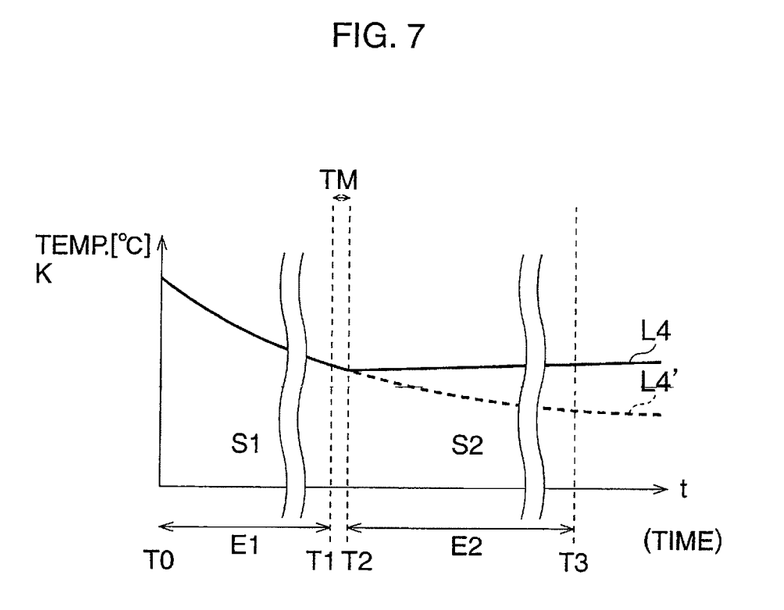
FIG. 7 is graph illustrating the change in the temperature of the CCD according to the second embodiment.

FIG. 7 is a graph showing the change in the CCD temperature according to the second embodiment.

In the second embodiment, during a dark exposure an image signal processing circuit 40, back light 46, and a metering sensor 53 (all shown in FIG. 1) are operated for heating. Concretely, image pixel signals that have "zero" levels are input to the image signal processing circuit 40 in which a series of image signal processes are applied to the input image-pixel signals, but the generated image data are not stored in the RAM 41. Such image signal processing during the dark exposure does not affect the dark exposure or the image signal process.

Also, the back light 46 is turned ON in a state when a recording image is not replayed. Furthermore, the metering sensor 57 is turned ON so that the metering sensor 57 is driven during the dark exposure.

The heating motions of the above electric circuit or electronic device only cause heat and are not directly associated with a photography process. The generated heat is transmitted to the CCD 33. Consequently, a decrease in the CCD temperature is restricted during the dark exposure, which allows for the dark exposure to be shortened. In FIG. 7, "L4" represents the change in CCD temperature when the above devices are operated and "L4'" represents the change in CCD temperature without the above devices being operated.

Next, a long-exposure photography process is explained with reference to FIGS. 8 and 9.

Figure 8:
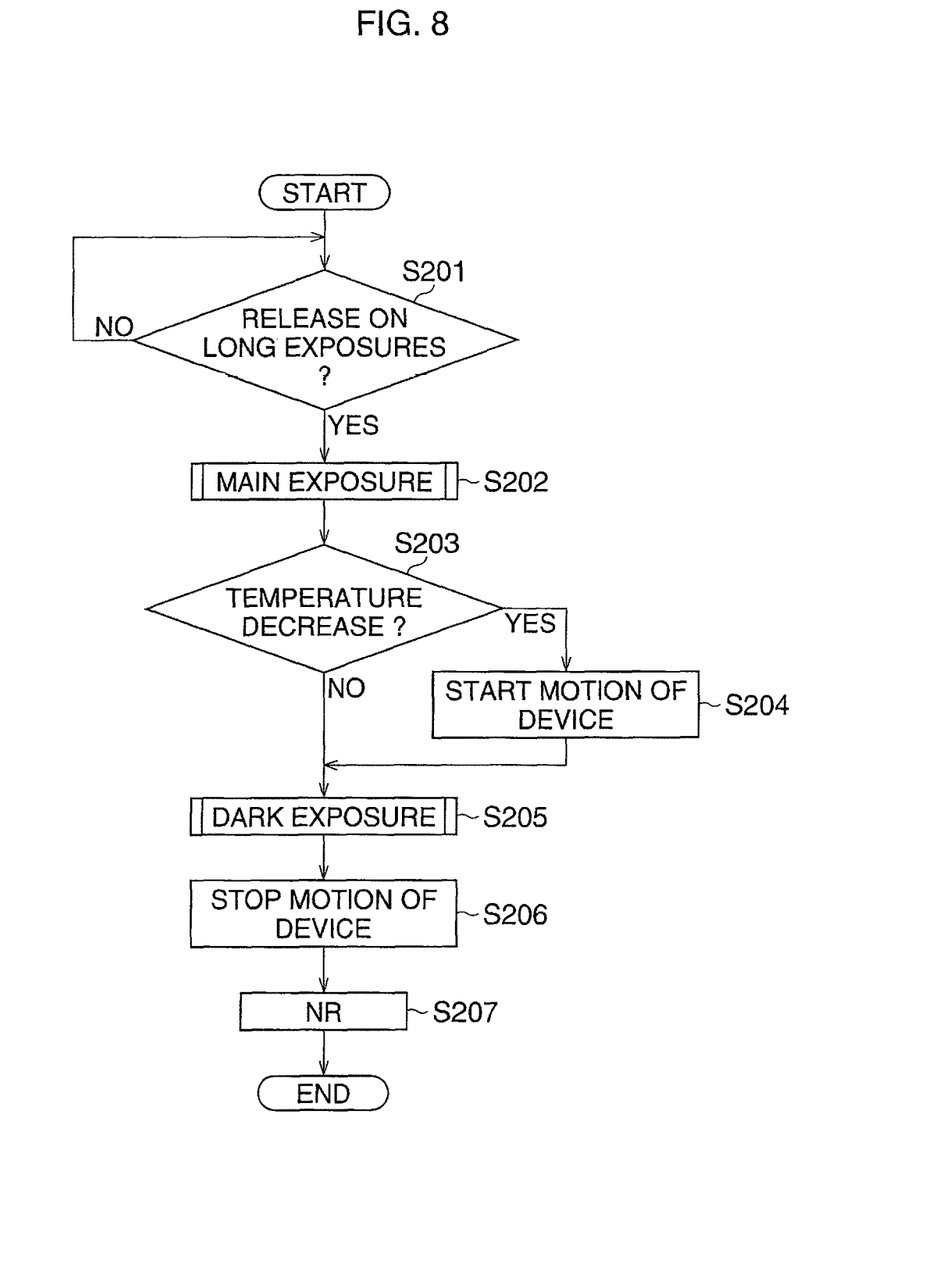
FIG. 8 is a flowchart of the photography process according to the second embodiment.
Figure 9:
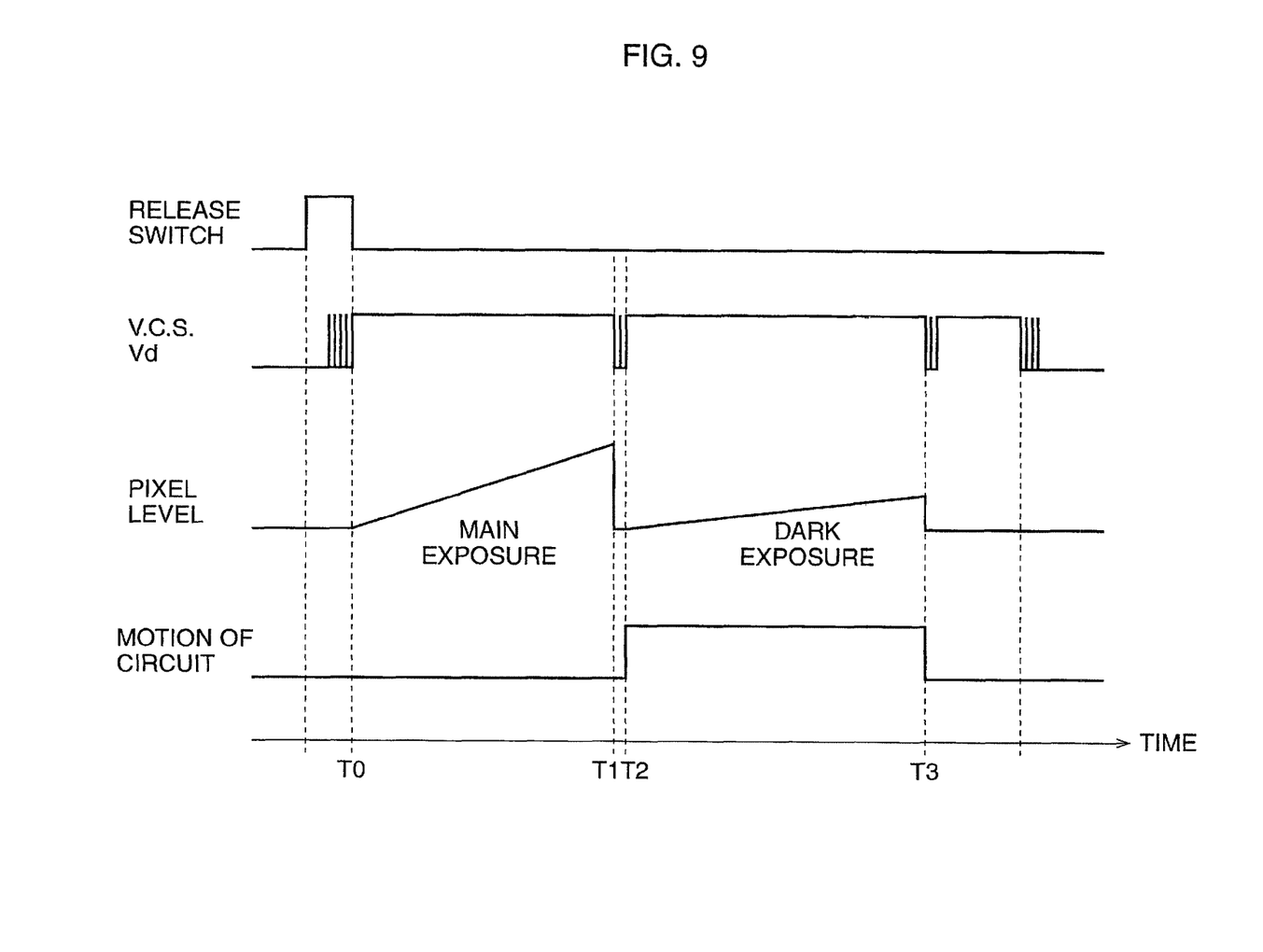
FIG. 9 is a timing chart of the photography process according to the second embodiment.

FIG. 8 is a flowchart of a photography process according to the second embodiment. FIG. 9 is a timing chart of a photography process according to the second embodiment.

Similarly to the first embodiment, when a release button is depressed in a state when an exposure is equal to or longer than a predetermined period, the main exposure is carried out and it is determined whether the CCD temperature decreases (S201-S203). If the CCD temperature decreases, the image signal processing circuit 40, the back light 46, and the metering sensor 53 are driven in accordance to the start of the dark exposure (S204 and S205). Herein, the start of the motion of these devices is almost simultaneous with the start of the dark exposure.

When the dark exposure ends, the heating motion of the devices finish accordingly, and a noise reduction process is carried out (S206 and S207). On the other hand, when the CCD temperature increases, the devices are not operated for heating.

In this way, in the present embodiment, some devices that receive electric power are operated to increase the temperature of the CCD 33. Note that one or more devices may be operated for heating. The devices may be operated for either part or all of the total period of the dark exposure.

A combination of the first and second embodiment may be applied. Also, a camera other than an SLR-type camera may be applied.

The present disclosure relates to subject matter contained in Japanese Patent Application No. 2011-170958 (filed on Aug. 4, 2011), which is expressly incorporated herein by reference, in its entirety.

The invention claimed is:

1. A camera comprising:
an image sensor;
an exposure controller that carries out a main exposure and a dark exposure, in order, when a long-exposure shooting is carried out;
an image signal processor that processes image-pixel signals that are generated by the main exposure and are read from said image sensor; and
a noise reduction processor that reduces dark current components in the image-pixel signals on the basis of dark current components that are obtained by the dark exposure, said exposure controller operating said image sensor for heating after reading of the image-pixel signals generated by the main exposure and before the dark exposure.

2. The camera of claim 1, wherein said exposure controller operates said image sensor for a predetermined period so as to increase a temperature of said image sensor at the end of the main exposure.

3. The camera of claim 1, further comprising a temperature sensor configured to detect a temperature, said temperature sensor being arranged next to said image sensor, said exposure controller operating said image sensor when a detected temperature decreases during the main exposure.

4. The camera of claim 3, wherein said exposure controller finishes the dark exposure when an amount of dark current in the dark exposure is equal to the dark current from the main exposure, on the basis of the detected temperature.

5. The camera of claim 4, wherein said exposure controller monitors a temperature detected by said temperature sensor at given time intervals during the dark exposure, said exposure controller determines with respect to a target pixel whether an amount of the dark current in the dark exposure reaches that from the main exposure, in accordance to the relationship between the temperature of said image sensor and the amount of generated dark current.

6. The camera of claim 2, wherein said exposure controller operates said image sensor for a predetermined period such that the period of the dark exposure is shorter than that of the main exposure.

7. The camera of claim 3, wherein said exposure controller does not operate said image sensor when a detected temperature does not decrease during the main exposure.

8. The camera of claim 1, wherein said exposure controller reads image-pixel signals, which are not used in the formation of a photographic image, from said image sensor during the operation of said image sensor that is carried out by said exposure controller between the main exposure and the dark exposure.

9. An apparatus for controlling a long-exposure shooting, comprising:
   a main exposure controller that carries out a main exposure to obtain image-pixel signals corresponding to a photographic image;
   a motion controller that operates an image sensor for a given period after the main exposure to increase the temperature of said image sensor; and
   a dark exposure controller that carries out a dark exposure after the operation of said image sensor that is controlled by said motion controller, the motion controller operating said image sensor to increase the temperature after a completion of the main exposure and before start of the dark exposure.

10. A method for controlling a long-exposure shooting, comprising:
    carrying out a main exposure to obtain image-pixel signals corresponding to a photographic image;
    operating an image sensor for a given period after the main exposure so as to increase a temperature of the image sensor; and
    carrying out a dark exposure after the operation of the image sensor for the given period, operation of the image sensor to increase the temperature being carried out after completion of the main exposure and before start of the dark exposure.

11. A camera comprising:
    an image sensor;
    an exposure controller that carries out a main exposure and a dark exposure, in order, when a long-exposure shooting is carried out;
    an image signal processor that processes image-pixel signals that are generated by the main exposure and are read from said image sensor; and
    a noise reduction processor that reduces dark current components in the image-pixel signals on the basis of dark current components that are obtained by the dark exposure, said exposure controller operating at least one electric-powered device that is activated during the dark exposure, the at least one electric-powered device being distinct from the image sensor, and is operative to heat the image sensor concurrently with the start of the dark exposure.

12. The camera of claim 11, wherein said exposure controller starts operating said image sensor in response to the start of the dark exposure.

13. The camera of claim 11, further comprising a temperature sensor configured to detect a temperature, said temperature sensor being arranged next to said at least one electric-powered device, said exposure controller operating said at least one electric-powered device when a detected temperature decreases during the main exposure.

14. The camera of claim 13, wherein said exposure controller finishes the dark exposure at a time when an amount of dark current in the dark exposure becomes equal to the dark current from the main exposure, on the basis of the detected temperature.

15. The camera of claim 14, wherein said exposure controller monitors a temperature detected by said temperature sensor at given time intervals during the dark exposure, said exposure controller determines with respect to a target pixel whether an amount of dark current in the dark exposure reaches that from the main exposure, in accordance to the relationship between the temperature of said image sensor and an amount of generated dark current.

16. The camera of claim 12, wherein said exposure controller operates said at least one electric-powered device during a predetermined period such that the period of the dark exposure is shorter than that of the main exposure.

17. The camera of claim 11, wherein said exposure controller does not operate said at least one electric-powered device when a detected temperature does not decrease during the main exposure.

18. The camera of claim 11, further comprising a display device associated with a display of a photographic image, said exposure controller operating at least one of said image signal processor and said display device.

19. The camera of claim 11, the at least one electric-powered device is switched between an on state and off state, said exposure controller turning ON said at least one electric-powered device during the dark exposure.

20. An apparatus for controlling a long-exposure shooting, comprising:
    a main exposure controller that carries out a main exposure to obtain image-pixel signals corresponding to a photographic image in an image sensor;
    a dark exposure controller that carries out a dark exposure after the main exposure; and
    a motion controller that operates at least one electric-powered device 44 concurrently with the start of the dark exposure to heat said image sensor, the at least one electric-powered device being distinct from the image sensor.

21. A method for controlling a long-exposure shooting, comprising:
    carrying out a main exposure to obtain image-pixel signals corresponding to a photographic image in an image sensor;
    carrying out a dark exposure after the main exposure; and
    operating at least one electric-powered device concurrently with the start of the dark exposure to heat said image sensor, the at least one electric-powered device being distinct from the image sensor.

22. A camera comprising:
    an image sensor;
    an exposure controller that carries out a main exposure and a dark exposure, in order, when a long-exposure shooting is carried out;
    an image signal processor that processes image-pixel signals that are generated by the main exposure and are read from said image sensor; and
    a noise reduction processor that reduces dark current components in the image-pixel signals on the basis of dark current components that are obtained by the dark exposure, said exposure controller operating said image sensor for heating between the main exposure and the dark exposure;
    wherein said exposure controller reads image-pixel signals, which are not used in the formation of a photographic image, from said image sensor during the operation of said image sensor that is carried out by said exposure controller between the main exposure and the dark exposure.

\* \* \* \* \*